United States Patent Office 3,321,306
Patented May 23, 1967

3,321,306
GALVANIC ANODE ALLOY AND PRODUCTS PRODUCED THEREFROM
John T. Reding, Freeport, and John J. Newport III, and James R. Minderhout, Lake Jackson, Tex., assignors to The Dow Chemical Company, Midland, Mich., a corporation of Delaware
No Drawing. Filed July 23, 1964, Ser. No. 384,775
5 Claims. (Cl. 75—146)

ABSTRACT OF THE DISCLOSURE

The invention is an aluminum base alloy containing zinc and mercury within well-defined specific limits. This particular alloy exhibits a high electrochemical efficiency and an oxidation potential in the range particularly suitable for galvanic protection in seawater applications.

---

This invention relates to sacrificial galvanic anodes and more particularly is concerned with a novel aluminum based alloy exhibiting a high electrical output per unit mass of metal, i.e. a high electrochemical efficiency and an oxidation potential in the range particularly suitable for use as a sacrificial anode in sea water applications.

At present, zinc is extensively used as a galvanic sacrificial anode in the cathodic protection of installations operated in or in contact with sea water. Zinc, which has a potential of about 1 volt (measured versus calomel reference), is satisfactory for this use and possesses the advantage that its working potential provides less possibility of damage to protective surface films such as protective coatings and paints than anode materials having higher working potentials, such as magnesium ($\sim 1.5$ volts). Zinc, however, suffers from the disadvantage that it has a relatively low ampere-hour capacity of about 370 ampere-hours per pound.

Aluminum, which has a high theoretical electrical output per unit mass of metal consumed (about 1350 ampere-hours per pound), in actual practice has not proved to be useful as a sacrificial galvanic anode in that the presence of the normally passive oxide surface film on aluminum apparently presents a barrier to the oxidation of the metal thereby reducing the effective oxidation potential to about 0.7 volt (as measured in closed circuit at either about 250 or about 1000 milliamperes per square foot in a synthetic sea water electrolyte with a standard saturated KCl calomel cell as reference). At such a low operating voltage, no cathodic protection is given to ferrous based structures, for example; therefore, the anode exhibits no useful electrical output.

It is a principal object of the present invention therefore to provide a novel aluminum based alloy composition which exhibits an oxidation potential of from about 0.9 to about 1.2 volts (versus calomel reference) and an electrical output per pound markedly increased over that shown by zinc.

It is another object of the present invention to provide a novel aluminum alloy composition exhibiting high efficiency of electrical output per unit mass of metal consumed (ampere-hours per pound) when used as a sacrificial galvanic anode in cathodic protection installations.

It is another object of the present invention to provide a novel aluminum alloy composition suitable for use as a sacrificial anode for cathodic protection of installations operated in or in contact with sea water or other waters having high salinity.

It is another object of the present invention to provide a novel aluminum alloy composition suitable for use as a galvanic protective coating for ferrous-base material.

These and other objects and advantages readily will become apparent from the detailed description of the invention presented hereinafter.

The present invention comprises a novel aluminum based alloy having from about 0.01 to about 1 weight percent zinc and from about 0.002 to about 0.2 weight percent mercury.

Preferably the alloy comprises aluminum having alloyed therewith from about 0.03 to about 0.5 weight percent zinc and from about 0.005 to about 0.05 weight percent mercury. All weight percents are based on total composition weight.

Generally, within the disclosed alloy range, optimum efficiencies are realized if the mercury concentration is increased as the zinc concentration is increased.

As the zinc concentration is extended beyond the range set forth herein, the corrosion pattern of the alloy becomes irregular and is accompanied by massive metal losses through segregation, i.e. spalling. This spalling loss becomes most pronounced during the last half of the life of the anode. This is objectionable as detrimental reduction in anode efficiency is realized.

Unexpectedly, the present novel alloy composition when employed as sacrificial galvanic anodes exhibits a satisfactory, relatively smooth corrosion pattern throughout the life of the anode, an operating oxidation potential of from about 0.9 to about 1.2 volts depending upon the current density of operation and an efficiency (actual electrical output in ampere hours per pound of metal consumed as compared to theoretical) of greater than 1250 ampere-hours per pound.

Galvanic anodes can be prepared from the novel compositions by use of alloying and casting or fabricating techniques ordinarily employed in the aluminum art.

Aluminum for use in preparing the present novel alloy compositions can be commercial grade (99.5 to 99.9% Al) metal having normal production introduced impurities associated therewith. If desired, higher purity aluminum, (e.g. 99.99% purity) can be employed but this is not necessary to achieve high potentials and anode efficiencies (i.e. high electrical output per unit mass of metal). The alloying metals also can be of high purity or of commercial grade.

The following examples will serve to further illustrate the present invention but are not meant to limit it thereto.

Example 1

A number of anodes of the present invention were prepared by melting commercial 99.5 of 99.9% purity aluminum ingot in a graphite crucible positioned within an electric furnace. Requisite amounts of mercury and zinc alloying ingredients were introduced into the molten aluminum and the resulting mixture stirred to effect dispersion and solution of the alloying ingredients throughout the melt. The resulting alloy was cast in a graphite mold into cylindrical specimens about 5½ inches long and either about ⅝ inch or 1 inch in diameter. The cooling and solidification rate of the castings were controlled such that these simulated the cooling rate experienced in production of commercial, field-sized cast anodes.

The performance of the alloys was evaluated by positioning each cast cylindrical specimen (as anode) in a one-half gallon glass jar. A steel wire mesh was placed adjacent to the inner wall of the jar as a cathode. Synthetic sea water was used as an electrotyle with about 3 inches of each specimen being immersed. The cells were completed with respect to electrical circuitry, a rectifier being employed to maintain a constant current through a group of cells connected in series.

The results of a number of runs comparing the performance at a current density of about 1000 milliamperes per square foot of the novel aluminum alloy anodes of the composition of the present invention with the commercial aluminum used as a base metal for these alloys are summarized in Table 1. These results present data showing both the solution potential and electrical output per unit mass of metal (efficiency) for the anodes tested.

The results obtained in the laboratory tests were confirmed by actual field tests in flowing sea water by using 1-inch and 3-inch anodes.

TABLE 1

| Run No. | Alloying Ingredient (percent by weight) | | Aluminum Purity (percent-nominal) | Total Current (amp.-hrs.) | Results | |
|---|---|---|---|---|---|---|
| | Zn | Hg | | | Potential (volts) [1] | Efficiency (percent) [2] |
| 1 | 0.031 | 0.005 | 99.9 | 52 | 0.92 | 96.5 |
| 2 | 0.070 | 0.008 | 99.9 | 52 | 0.98 | 98 |
| 3 | 0.13 | 0.022 | 99.9 | 97 | 0.97 | 97 |
| 4 | 0.22 | 0.013 | 99.9 | 38 | 1.05 | 97 |
| 5 | 0.57 | 0.018 | 99.9 | 38 | 1.07 | 98 |
| 6 | 0.75 | 0.028 | 99.9 | 61 | 1.00 | 95 |
| 7 | 0.11 | 0.037 | 99.5 | 25 | 1.00 | 88 |
| 8 | | [3] | 99.5 | | 0.71 | |
| 9 | | [3] | 99.9 | | 0.72 | |

[1] Sat. calomel cell reference.
[2] Based on theoretical output at 1,350 ampere-hours/pound.
[3] Control.

These results clearly show the superiority of the present novel alloy composition with respect to solution potential and high electrochemical equivalent as compared to the aluminum base material. It is to be further noted that the solution potential and useful electrical output of the present novel composition is in the range desired and required for successful function as sacrificial galvanic anodes particularly in cathodic protection of installation in sea water and saline waters.

*Example 2*

A molten bath of an aluminum base alloy was prepared. This alloy contained about 0.022 weight percent mercury, about 0.13 weight percent zinc and the balance being aluminum with its incidental impurities.

Cold rolled steel coupons measuring about 1 inch by 3 inches by 16 gauge thickness which had been degreased in perchloroethylene and acid pickled in 15 percent aqueous hydrochloric acid solution, water washed and dried were immersed in the molten alloy.

A substantially continuous coating about 5 mils thick of the alloy adhered to the coupons. This solidified as the coupons were removed from the molten alloy bath and cooled.

The galvanic properties of the so-coated coupons were tested in a standard test by measuring the solution potential with respect to a saturated potassium chloride calomel reference electrode both in sea water and ordinary tap water. The resulting potentials were about 1.08 volts in sea water and about 0.94 volt in the fresh tap water.

Similar galvanic protection to ferrous-based substrates is realized by flame spraying the alloy of the present invention onto the substrate, applying paint or binder systems thereto wherein the present alloy in powdered form is in high ratio to the carrying vehicle or binder, by spraying the alloy onto a heated ferrous surface, the temperature of the ferrous material being sufficient to melt the aluminium alloy and assure adherence between the alloy and substrate, and the like methods of application.

The novel alloy composition also is suitable for use as sacrificial anodes for applications such as galvanic pigments in paint films, galvanic anode materials for primary batteries and, as shown hereinbefore as, sacrificial galvanic coatings for sheet steel and other metals cathodic to aluminum. Additionally this composition finds utility as an active ingredient in flares, for use in chemical reductions and in the preparation of aluminum alkyls.

Various modifications can be made in the present invention without departing from the spirit or scope thereof for it is understood that we limit ourselves only as defined in the appended claims.

We claim:
1. An aluminium alloy consisting essentially of;
    from about 0.01 to about 1 weight percent zinc,
    from about 0.002 to about 0.2 weight percent mercury, and
    balance aluminum.
2. An aluminum alloy consisting essentially of;
    from about 0.03 to about 0.5 weight percent zinc,
    from about 0.005 to about 0.05 weight percent mercury, and
    balance aluminum.
3. An aluminum based sacrificial galvanic anode having an oxidation potential of from about 0.9 to about 1.2 volts and a high electrical equivalent consisting essentially of;
    a cast anode structure, said structure comprising,
    from about 0.01 to about 1 weight percent zinc,
    from about 0.002 to about 0.2 weight percent mercury, and
    balance aluminum.
4. An aluminum based sacrificial galvanic anode having an oxidation potential of from about 0.9 to about 1.2 volts and a high electrical equivalent consisting essentially of;
    a cast anode structure, said structure comprising,
    from about 0.03 to about 0.5 weight percent zinc,
    from about 0.005 to about 0.05 weight percent mercury, and
    balance aluminum.
5. An article comprising a ferrous-based metal coated with a galvanic aluminum alloy, said aluminum alloy consisting essentially of from about 0.01 to about 1.0 weight percent zinc, from about 0.002 to about 0.2 weight percent mercury, the balance being aluminum.

References Cited by the Examiner
UNITED STATES PATENTS 2,758,082  8/1956  Rohrman _____ 75—138
3,172,760  3/1965  Sakano et al. _____ 75—146

HYLAND BIZOT, *Primary Examiner.*
DAVID L. RECK, *Examiner.*
R. O. DEAN, *Assistant Examiner.*